(12) United States Patent
Aurongzeb et al.

(10) Patent No.: US 10,067,582 B2
(45) Date of Patent: *Sep. 4, 2018

(54) NON-LINE-OF-SIGHT TOUCH INPUT DEVICE

(71) Applicant: Dell Products L.P., Round Rock, TX (US)

(72) Inventors: Deeder M. Aurongzeb, Round Rock, TX (US); Abu Shaher Sanaullah, Austin, TX (US); Jason Tait Franz, Austin, TX (US); Justin Cole Lyles, San Diego, CA (US); Charles D. Hood, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 305 days.

This patent is subject to a terminal disclaimer.

(21) Appl. No.: 15/078,676

(22) Filed: Mar. 23, 2016

(65) Prior Publication Data

US 2016/0202772 A1    Jul. 14, 2016

Related U.S. Application Data

(63) Continuation of application No. 14/229,040, filed on Mar. 28, 2014.

(51) Int. Cl.

| | | |
|---|---|---|
| *G06F 9/4401* | (2018.01) |
| *G06F 3/041* | (2006.01) |
| *G06F 3/023* | (2006.01) |
| *G06F 3/0485* | (2013.01) |
| *G06F 3/0483* | (2013.01) |
| *G06F 3/0488* | (2013.01) |
| *G06F 3/038* | (2013.01) |
| *G06F 3/0354* | (2013.01) |
| *G06F 1/16* | (2006.01) |

(52) U.S. Cl.
CPC ............ *G06F 3/041* (2013.01); *G06F 1/1618* (2013.01); *G06F 1/1677* (2013.01); *G06F 3/023* (2013.01); *G06F 3/038* (2013.01); *G06F 3/03547* (2013.01); *G06F 3/0483* (2013.01); *G06F 3/0485* (2013.01); *G06F 3/04883* (2013.01); *G06F 3/04886* (2013.01)

(58) Field of Classification Search
CPC combination set(s) only.
See application file for complete search history.

(56) References Cited

U.S. PATENT DOCUMENTS

| | | | |
|---|---|---|---|
| D622,269 S | 8/2010 | Morooka et al. | ............ D14/316 |
| 8,023,256 B2 | 9/2011 | Walker et al. | ............ 361/679.27 |
| 2011/0128216 A1 | 6/2011 | Renwick | ........................ 345/156 |
| 2014/0281444 A1 | 9/2014 | Waltermann et al. | ............ 713/1 |

OTHER PUBLICATIONS

Http://2inlpcs.com/category/360-hinge-2-in-1; "2 in 1 pcS", 360 Hinge; pp. 2, Mar. 10, 2014.
Lenovo ThinkPad Yoga 12.5Inch Convertible Laptop | 2in1 PCs at «http://2in1pcs.com/lenovothinkpadyoga125inchconvertiblelaptop/», 3 pages, Mar. 10, 2014.

*Primary Examiner* — Van N Chow
(74) *Attorney, Agent, or Firm* — Baker Botts L.L.P.

(57) ABSTRACT

A portable information handling system may be used in tablet-laptop mode, where a first body and a second body are rotatable about each other within an angular range of about 360°. Depending on the detected angular rotation of the first body about the second body, among other detectable usage aspects, line-of-sight operation or non-line-of-sight operation of touch input devices, such as a touch pad and/or a keyboard, may be activated.

20 Claims, 4 Drawing Sheets

NON-LINE-OF-SIGHT TOUCH INPUT DEVICE

CROSS-REFERENCE TO RELATED APPLICATION

This application is a continuation of application Ser. No. 14/229,040 titled "Non-Line-Of-Site Touch Input Devices," filed Jul. 19, 2013, which is incorporated herein by reference.

BACKGROUND

Field of the Disclosure

This disclosure relates generally to portable information handling systems and, more particularly, to a non-line-of-sight touch input devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Liquid crystal displays (LCDs) are commonly employed for portable information handling systems configured in the form of laptop, notebook, netbook, and tablet computers, among others. The LCD of a typical laptop computer is mounted within a display housing that is hingeably attached to a base housing that contains the keyboard for the notebook computer. Recently various designs for portable information handling systems have been introduced that combine conventional laptop and tablet functionality, also referred to herein as "tablet-laptop" systems, and may employ various types of connections to a base housing, including various types hinge mechanisms. Furthermore, with the advent of various operating systems supporting touch operation, integration of input devices responding to touch input have become highly relevant to satisfying market expectations.

SUMMARY

In one aspect, a disclosed method may enable non-line-of-sight operation of a touch pad in a portable information handling system. The portable information handling system may include a first body including a solid-state keyboard on a first surface of the first body and the touch pad on the first surface. The portable information handling system may include a second body including a display device hingeably attached to rotate about the first body. When the second body is rotated less than about 180° about the first body, the method may include activating the solid-state keyboard to receive first user input from buttons of the solid-state keyboard, and deactivating at least a portion of the touch pad from receiving second user input from touch activity on the touch pad. When the second body is rotated greater than about 340° about the first body, the method may include deactivating at least a portion of the solid-state keyboard from receiving the first user input, and activating at least a portion of the touch pad to receive the second user input.

Other disclosed aspects include an input device for a portable information handling system and a portable information handling system including the input device.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
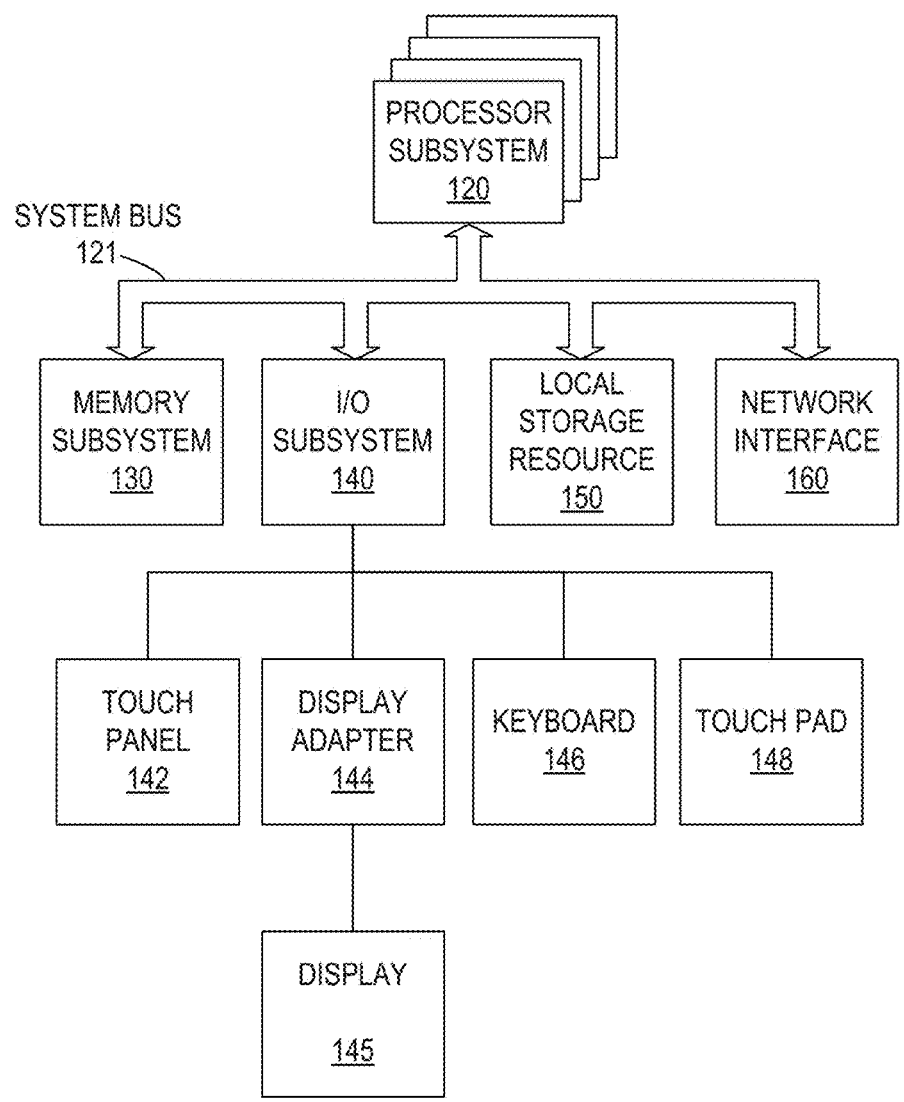
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, current portable information handling systems may rely upon input devices responding to touch input. As will be described in further detail, the inventors of the present disclosure have developed methods and systems disclosed herein for integrating a non-line-of-sight device in a tablet-laptop-type portable information handling system.

Particular embodiments are best understood by reference to FIGS. 1, 2A, 2B, 3, and 4 wherein like numbers are used to indicate like and corresponding parts.

Turning now to the drawings, FIG. 1 illustrates a block diagram depicting selected elements of an embodiment of portable information handling system 100. In various embodiments, portable information handling system 100 may represent a laptop-style system having a first body and a second body that are hingeably attached together, and may be convertible for use as a tablet or a laptop (tablet-laptop). In particular embodiments, the first body and the second body of portable information handling system 100 may be rotated about each other over an angular range of about 360° (see also FIG. 2).

As shown in FIG. 1, components of portable information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of network 155. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of physical hardware 102). In the same or alternative embodiments, processor subsystem 120 may interpret and/or execute program instructions and/or process data stored remotely (e.g., in a network storage resource).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In information handling system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142, display adapter 144, keyboard 146, and touch pad 148. Touch panel 142 may include circuitry for enabling touch functionality in conjunction with display 145 that is driven by display adapter 144.

As noted previously, portable information handling systems, such as portable information handling system 100, may be convertible for use as a tablet or a laptop (tablet-laptop). As will be described in further detail herein, the inventors of the present disclosure have discovered that touch pad 148 may be implemented to provide non-line-ofsight input when portable information handling system 100 is used in tablet mode (i.e., when the first body is rotated about the second body greater than about 340°.

Figure 2A:
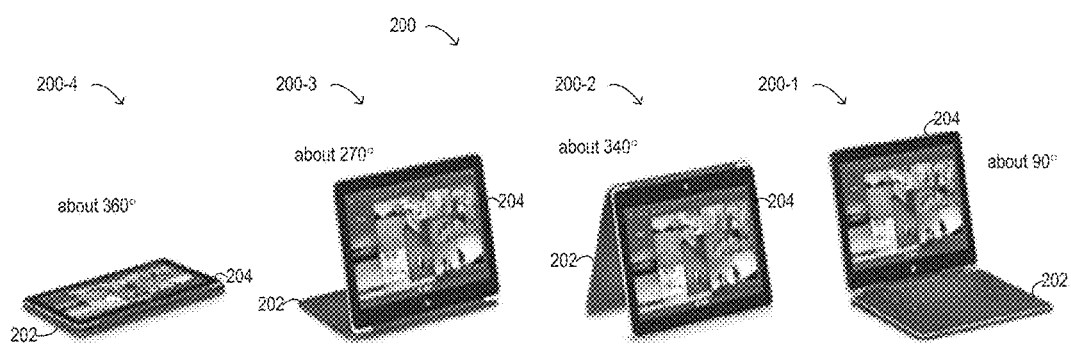
FIGS. 2A and 2B are images of selected elements of an embodiment of a portable information handling system with a non-line-of-sight input device.

Turning now to FIG. 2A, images of selected elements of an embodiment of portable information handling system 200 are illustrated. Portable information handling system 200 may represent an embodiment of portable information handling system 100 (see FIG. 1). In FIG. 2A various configurations of portable information handling system 200, which includes first body 202 and second body 204, are shown as 200-1, 200-2, 200-3, and 200-4.

Specifically, portable information handling system 200-1 in FIG. 2A shows first body 202 rotated with respect to second body 204 about 90°, representing a typical laptop-style configuration where first body 202 includes a keyboard and a touch pad and second body 204 includes a display device. In portable information handling system 200-1, first body 202, including the keyboard and the touch pad, are operated by a user in line-of-sight operation, since the input devices are visible to a user viewing the display. Accordingly, in portable information handling system 200-1 the keyboard may be activated for normal use and the touch pad may be activated for line-of-sight operation where certain portions of the touch pad may be deactivated to accommodate resting areas for palms or hands of the user, while other portions may be activated for line-of-sight touch operation (i.e., as a mouse device).

In portable information handling system 200-2 in FIG. 2A, first body 202 is rotated about 340° about second body 204 such that portable information handling system 200-2 may rest on the edges of first body 202 and second body 204, for example, for viewing the display included in second body 204. In portable information handling system 200-3, first body 202 is rotated about 270° about second body 204 and may represent a configuration for similar use as portable information handling system 200-2. It is noted that first body 202, including the keyboard, rests with the operational surface of the keyboard and the touch pad down. In various embodiments, the keyboard in portable information handling system 200 may be a solid-state multi-layer keyboard, also referred to as a "non-travel" keyboard, in which the keys do not physically move with respect to other portions of the keyboard, but instead, respond capacitively to touch input without substantial motion (i.e., no mechanical travel of the keys). Accordingly, in portable information handling system 200-2 and/or 200-3, the keyboard and the touch pad may be deactivated for display-mode only operation, while a touch panel (not shown explicitly) incorporated into second body 204 may remain active for direct touch input, which also represents line-of-sight operation.

Figure 2B:
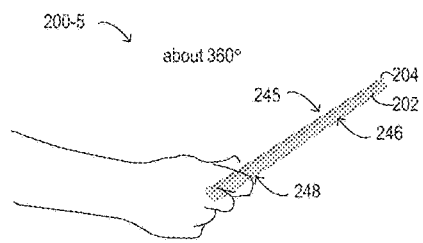

Finally, portable information handling system 200-4 depicts a configuration in which first body 202 is rotated about 360° about second body 204, which may represent a tablet mode (see also FIG. 2B). It is noted that the keyboard and the touch pad in portable information handling system 200-4, when resting on a working surface as shown, are facing down towards the working surface and are not accessible to a user. Accordingly, in portable information handling system 200-4, the keyboard and the touch pad may be deactivated when portable information handling system 200-4 detects the working surface and/or an orientation corresponding to laying on the working surface where a user does not have access to the keyboard and the touch pad.

Turning now to FIG. 2B, a drawing of selected elements of an embodiment of portable information handling system 200-5 in operation are illustrated. In FIG. 2B, portable information handling system 200-5 is shown in tablet mode with first body 202 rotated about second body 204 at approximately 360° and being held by a hand of a user in a typical usage scenario. In portable information handling system 200-5 of FIG. 2B, display surface 245 is observable by the user (i.e., line-of-sight operation), while keyboard surface 246 of keyboard 146 and touch pad surface 248 of touch pad 148 (see also FIG. 1) are not observable by the user (i.e., non-line-of-sight operation). In the usage scenario depicted in FIG. 2B, at least certain portions of keyboard surface 246 and/or keyboard 146 may be deactivated, while at least certain portions of touch pad surface 246 and/or touch pad 146 may be activated for non-line-of-sight operation. In non-line-of-sight operation of an input device, the user does not directly see the input device, such as the keyboard and/or the touch pad, but operates the input device at a back surface using one or more human digits. In certain embodiments, the keyboard may be entirely deactivated in non-line-of-sight operation of portable information handling system 200-5.

It is noted that portable information handling system 200 may include various sensors to detect when portable information handling system 200 is being held by a user in tablet mode, as shown in FIG. 2B. For example, a Hall sensor (not shown) may detect when portable information handling system 200 is folded back in the 360° configuration, for example, by detecting a displacement between first body 202 and second body 204. Additionally or alternatively, portable information handling system 200 may include a gyroscope and/or a magnetometer (not shown) to ascertain a particular spatial orientation during usage, for example, to distinguish between usage as in 200-4 (resting on a working surface) versus 200-5 (handheld by a user). Other sensors, such as a temperature sensor (not shown) at keyboard surface 246 and/or touch pad surface 248, may be used to detect increased local temperature due to body heat of the user.

Figure 3:
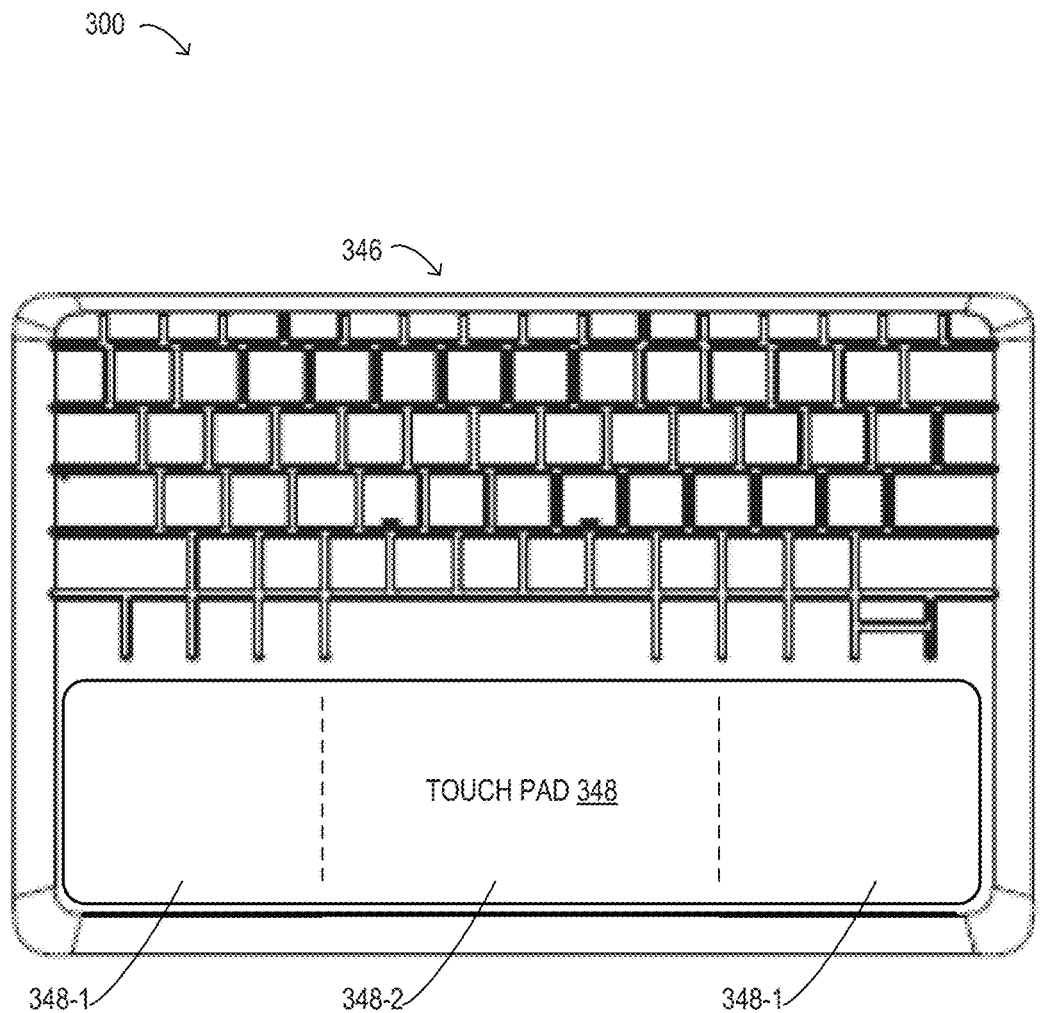
FIG. 3 is a block diagram of selected elements of an embodiment of a first body of a portable information handling system.

Turning now to FIG. 3, a block diagram of selected elements of an embodiment of first body 300 are illustrated. As shown in FIG. 3, first body 300 may represent an embodiment of first body 202 (see FIGS. 2A and 2B). In FIG. 3, first body 300 is shown with keyboard portion 346, which may represent a non-travel keyboard, as described previously. Touch pad 348 may represent an embodiment of touch pad 148 (see FIG. 1). As shown in FIG. 3, touch pad 148 comprises first area 348-2 at a central portion and second areas 348-1 at edge portions. For line-of-sight operation of touch pad 348, such as with portable information handling system 200-1 (see FIG. 2A), first area 348-2 may be activated, while second areas 348-1 are deactivated and may serve as palm rests for the user's hand. For non-line-of-sight operation of touch pad 348 (see FIG. 2B), both first area 348-1 and second areas 348-1 may be activated.

During non-line-of-sight operation of touch pad 348, as shown in FIG. 3, additional functionality for activation and/or deactivation may be implemented. For example, a working area of touch pad 348 may be defined by detecting at least one area corresponding to one or more tips of a human digit. The tip of the human digit may be identified by a detected size and/or shape of a touch area. The tip of the human digit may be identified by a thermal print corresponding to the size and/or shape of the tip of the human digit. The tip of the human digit may be identified by a pressure applied to touch pad 348, which may be between a first threshold pressure and a second threshold pressure. For example, the first threshold pressure may be selected to be a minimum pressure for touch activation of touch pad 348, while the second threshold pressure may be defined as a maximum pressure less than a pressure used for supporting portable information handling system 200-4 by the user's hand. The working area of touch pad 348 may be selected to extend within a length of a human digit from the surface area where a touch event originates, for example, the touch event where at least one area corresponding to a human digit tip is detected. In this manner, touch pad 348 may adapt to different ways that a user chooses to hold and operation portable information handling system 200. In some embodiments, touch pad 348, or at least certain portions thereof, may be mapped to a screen area of the display device. The mapping may include changing an orientation, such as by 90° with respect to a display orientation to facilitate natural movements of the user's human digits.

During non-line-of-sight operation of keyboard portion 346, as shown in FIG. 3, additional functionality for activation and/or deactivation may be implemented. For example, keyboard portion 346 may be partially deactivated, such that certain individual keys may remain activated for non-line-of-sight operation. For example, certain keyboard keys in a region proximate to an edge of first body 300 and/or proximate to an edge of keyboard region 346 may remain activated in non-line-of-sight operation of keyboard region 346, while other keys are deactivated. Furthermore, the activated keyboard keys in non-line-of-sight operation of keyboard region 346 may be assigned different functionality than in line-of-sight operation, for example, depending on an application executing on the information handling system of which first body 300 is a component. In some embodiments, all of keyboard region 346 is deactivated for non-line-of-sight operation.

As noted previously, when portable information handling system 200 is used in the configuration depicted in FIG. 2B, at least certain portions of keyboard area 346 may be deactivated while at least certain portions of touch pad 348 may be activated to facilitate non-line-of-sight operation by the user. Furthermore, the user input provided to the touch pad by the user may include various kinds of touch activity to which touch pad 348 may be enabled to specifically detect and respond to. For example, touch pad 348 may be enabled to identify and respond to movements for controlling a cursor, taps for controlling mouse clicks, swipes for advancing page displays, and/or sliding motions for scrolling.

Although automatic detection of tablet mode and/or handheld tablet mode by portable information handling system 200 have been described, it is noted that tablet mode and/or handheld tablet mode may be manually activated by the user using a hardware and/or software switching element, such as a button, switch, keyboard key combination, etc. Accordingly, tablet mode and/or hand-held tablet mode may be activated in response to receiving explicit user input indicating that non-line-of-sight operation is desired, including non-line-of-sight operation of touch pad 348 and/or keyboard portion 346. Other forms of the explicit user input for activating tablet mode and/or hand-held tablet mode may include touch activity on the touch pad exceeding a specified duration, touch activity on the touch pad corresponding to a specified gesture, and/or touch activity at a specified portion of the touch pad (e.g., at a particular corner of touch pad 348).

Figure 4:
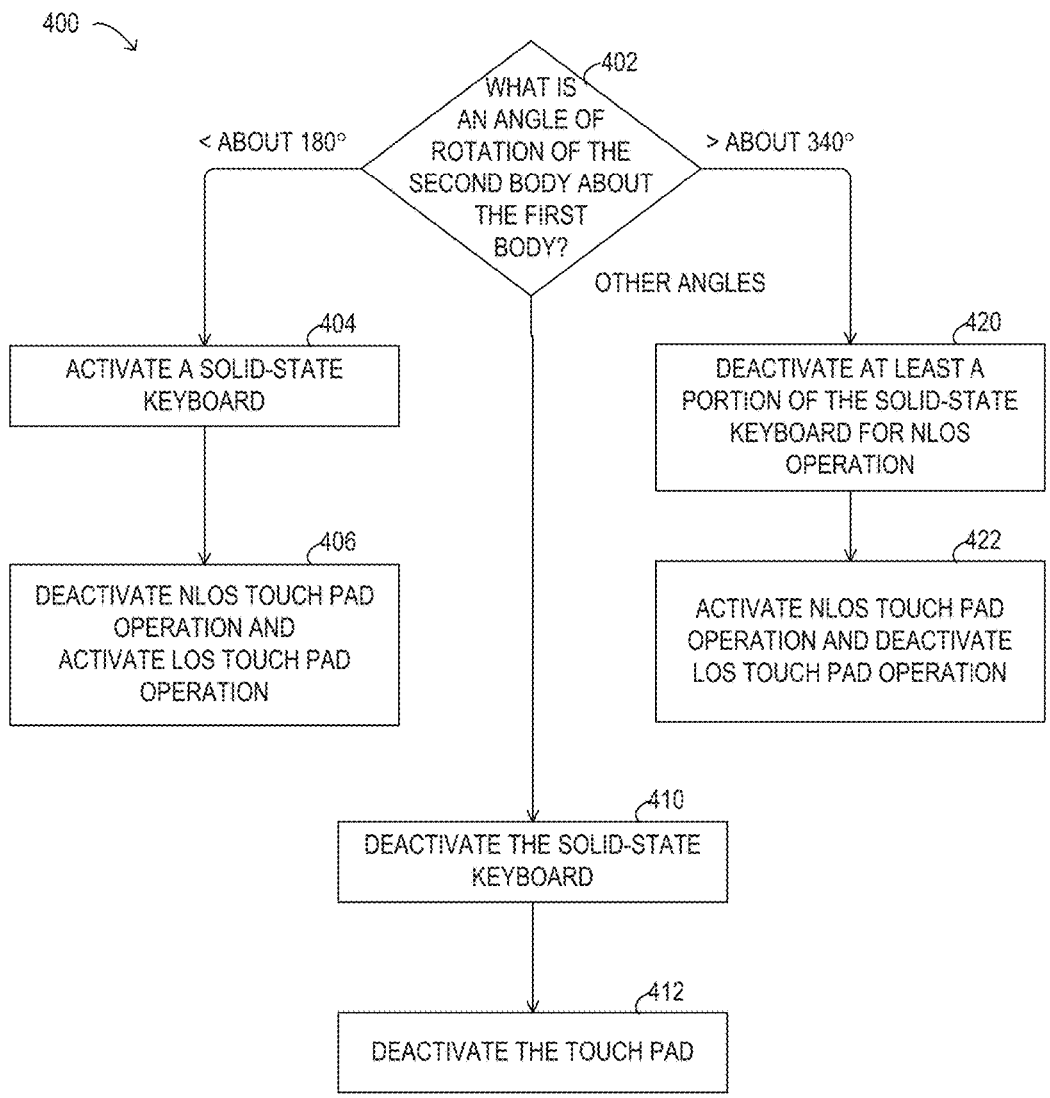
FIG. 4 is flowchart depicting selected elements of an embodiment of a method for operating a non-line-of-sight input device with a portable information handling system.

Referring now to FIG. 4, a block diagram of selected elements of an embodiment of method 400 for non-line-of-sight operation of a touch input device, such as touch pad 348 included with portable information handling system 200 (see FIGS. 1-3), as described herein, is depicted in flowchart form. It is noted that certain operations described in method 400 may be optional or may be rearranged in different embodiments.

In FIG. 4, method 400 may begin by making a determination (operation 402) about what the angle of rotation of the second body about the first body is. When the result of operation 402 is less than about 180°, method 400 may proceed to activate (operation 404) a solid-state keyboard. Then, non-line-of-sight (NLOS) touch pad operation may be deactivated (operation 406) while line-of-sight (LOS) touch pad operation may be activated (operation 406). When the result of operation 402 is greater than about 340°, method 400 may proceed to deactivate (operation 420) at least a portion of the solid-state keyboard for non-line-of-sight operation. Then, non-line-of-sight (NLOS) touch pad operation may be activated (operation 422) while line-of-sight (LOS) touch pad operation may be deactivated (operation 422). When the result of operation 402 is another angle, method 400 may proceed to deactivate (operation 410) the solid-state keyboard. Then, the touch pad may be deactivated (operation 412)

As disclosed herein, a portable information handling system may be used in tablet-laptop mode, where a first body and a second body are rotatable about each other within an angular range of about 360°. Depending on the detected angular rotation of the first body about the second body, among other detectable usage aspects, line-of-sight operation or non-line-of-sight operation of touch input devices, such as a touch pad and/or a keyboard, may be activated.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for enabling non-line-of-sight operation of a touch pad in a portable information handling system, wherein the portable information handling system includes:
a first body comprising:
a solid-state keyboard on a first surface of the first body; and
the touch pad on the first surface; and
a second body comprising:
a display device hingeably attached to rotate about the first body, the method comprising:
when the second body is rotated less than about 180° about the first body:
activating the solid-state keyboard to receive first user input from buttons of the solid-state keyboard; and
deactivating at least a portion of the touch pad from receiving second user input from touch activity on the touch pad;
when the second body is rotated greater than about 340° about the first body:
deactivating at least a portion of the solid-state keyboard from receiving the first user input; and
activating at least a portion of the touch pad to receive the second user input.

2. The method of claim 1, wherein the second body further includes:
a touch panel associated with the display device, and wherein the method further comprises:
when the second body is rotated between about 180° and about 340° about the first body:
deactivating the solid-state keyboard from receiving the first user input; and
deactivating the touch pad from receiving the second user input.

3. The method of claim 1, wherein the activating at least a portion of the touch pad to receive the second user input is performed responsive to:
detecting a touch event on the touch pad, wherein the touch event originates from a surface area on the touch pad corresponding to a tip of at least one human digit.

4. The method of claim 3, further comprising:
activating a first section of the touch pad, the first section selected to extend within a length of a human digit from the surface area where the touch event originates; and
mapping the first section of the touch pad to a screen area of the display device.

5. The method of claim 4, wherein the mapping the first section of the touch pad includes:
rotating an orientation of the touch pad with respect to the display device.

6. The method of claim 1, wherein the activating at least a portion of the touch pad to receive the second user input is performed responsive to:
detecting a touch pressure on the touch pad, wherein the touch pressure is less than a first threshold pressure and greater than a second threshold pressure.

7. The method of claim 1, wherein the activating at least a portion of the touch pad to receive the second user input is performed responsive to:
detecting, at the first surface, an elevated temperature with respect to ambient temperature.

8. The method of claim 1, wherein the second user input includes touch activity selected from at least one of:
movements for controlling a cursor;
taps for controlling mouse clicks;
swipes for advancing page displays; and
sliding motions for scrolling.

9. The method of claim 1, wherein the activating at least a portion of the touch pad to receive the second user input is performed responsive to:
receiving third user input indicating activation of non-line-of-sight operation of the touch pad.

10. The method of claim 9, wherein the third user input is selected from at least one of:
operation of a switching element included in the portable information handling system;
touch activity on the touch pad exceeding a specified duration;
touch activity on the touch pad corresponding to a specified gesture; and
touch activity at a specified portion of the touch pad.

11. A portable information handling system for enabling non-line-of-sight operation of a touch pad, wherein the portable information handling system includes:
a first body comprising:
a solid-state keyboard on a first surface; and
the touch pad on the first surface;
a second body comprising:
a display device hingeably attached to rotate about the first body; and
a sensor for detecting an angular rotation of the second body about the first body; and
a processor subsystem having access to a memory, wherein the memory stores instructions that, when executed by the processor subsystem, cause the processor subsystem to:
when the second body is rotated less than about 180° about the first body:
activate the solid-state keyboard to receive first user input from buttons of the solid-state keyboard; and
deactivate at least a portion of the touch pad from receiving second user input from touch activity on the touch pad;
when the second body is rotated greater than about 340° about the first body:
deactivate at least a portion of the solid-state keyboard from receiving the first user input; and
activate at least a portion of the touch pad to receive the second user input.

12. The portable information handling system of claim 11, wherein the second body further includes:
a touch panel associated with the display device, and further comprising instructions to:
when the second body is rotated between about 180° and about 340° about the first body:
deactivate the solid-state keyboard from receiving the first user input; and
deactivate the touch pad from receiving the second user input.

13. The portable information handling system of claim 11, wherein the instructions to activate at least a portion of the touch pad to receive the second user input are performed responsive to instructions to:
detect a touch event on the touch pad, wherein the touch event originates from a surface area on the touch pad corresponding to a tip of at least one human digit.

14. The portable information handling system of claim 13, further comprising instructions to:
activate a first section of the touch pad, the first section selected to extend within a length of a human digit from the surface area where the touch event originates; and
map the first section of the touch pad to a screen area of the display device.

15. The portable information handling system of claim 14, wherein the instructions to map the first section of the touch pad include instructions to:
rotate an orientation of the touch pad with respect to the display device.

16. The portable information handling system of claim 11, wherein the instructions to activate at least a portion of the touch pad to receive the second user input are performed responsive to instructions to:
detect a touch pressure on the touch pad, wherein the touch pressure is less than a first threshold pressure and greater than a second threshold pressure.

17. The portable information handling system of claim 11, wherein the instructions to activate at least a portion of the touch pad to receive the second user input are performed responsive to instructions to:
detect, at the first surface, an elevated temperature with respect to ambient temperature.

18. The portable information handling system of claim 11, wherein the second user input includes touch activity selected from at least one of:
movements for controlling a cursor;
taps for controlling mouse clicks;
swipes for advancing page displays; and
sliding motions for scrolling.

19. The portable information handling system of claim 11, wherein the instructions to activate at least a portion of the touch pad to receive the second user input are performed responsive to instructions to:
    receive third user input indicating activation of non-line-of-sight operation of the touch pad.

20. The portable information handling system of claim 19, wherein the third user input is selected from at least one of:
    operation of a switching element included in the portable information handling system;
    touch activity on the touch pad exceeding a specified duration;
    touch activity on the touch pad corresponding to a specified gesture; and
    touch activity at a specified portion of the touch pad.

\* \* \* \* \*